Jan. 4, 1944. A. GUTER ET AL 2,338,428
CLAW COUPLING WITH SYNCHRONIZING DEVICE
Filed Aug. 15, 1940 3 Sheets-Sheet 1

Inventors:
August Guter
Albert Maier
by: Edmund H. Perry Jr.
Attorney.

Patented Jan. 4, 1944

2,338,428

UNITED STATES PATENT OFFICE 2,338,428

CLAW COUPLING WITH SYNCHRONIZING DEVICE

August Guter and Albert Maier, Friedrichshafen-on-the-Bodensee, Germany; vested in the Alien Property Custodian Application August 15, 1940, Serial No. 352,808
In Germany August 16, 1939

3 Claims. (Cl. 192—53)

Our invention relates to claw couplings having synchronizing devices and has special reference to couplings of this kind as used in power and speed transmissions, for instance with change speed gears for motor cars and the like.

The main obect of our invention is to prevent engagement of the two coupling halves to be engaged until both have come to substantially equal speed of rotation or as long as one half rotates while the other half stands still. The final engagement of both halves shall not be possible before they are synchronized.

There are other objects also connected with our invention which will be seen best when having reference to the drawings.

For our purpose we provide locking elements adapted to be moved by the torque for example radially with regard to the axis of the two coupling halves and which are in such connection with the synchronizing device that they prevent the claws, or clutch teeth, of the coupling to engage while the synchronizing device acts. But as soon as this device has caused the two coupling halves to rotate at equal speed the locking elements are automatically removed so as to allow final engagement of the clutch teeth of the coupling halves which are under adequate tension exerted by means of a hand lever or the like.

The construction according to our invention is extremely simple and cheap as additional intermediate toothed elements which are made use of in known constructions for similar purposes are not necessary here. That is why our construction has the further great advantage of being much shorter in the direction of the axis of its shaft. Of special value is the fact that the coupling according to our invention may be operated easily in shortest time and without injurious shocks or the like.

All this will be understood best when having reference to the drawings which represent several examples embodying our invention.

The first example is shown in Figs. 1 to 4, inclusive, of which Fig. 1 is a longitudinal section through a claw coupling for speed transmission gears; Fig. 2 is a top view on the circumference of the coupling, seen in the direction of arrow O in Fig. 1; Fig. 3 is a portion of a vertical section at right angles to that of Fig. 1 taken along line III—III thereof and showing the locking elements in their idling position, whereas in Fig. 4 the same vertical section is represented but with the locking elements being in the locking position.

Figure 1:
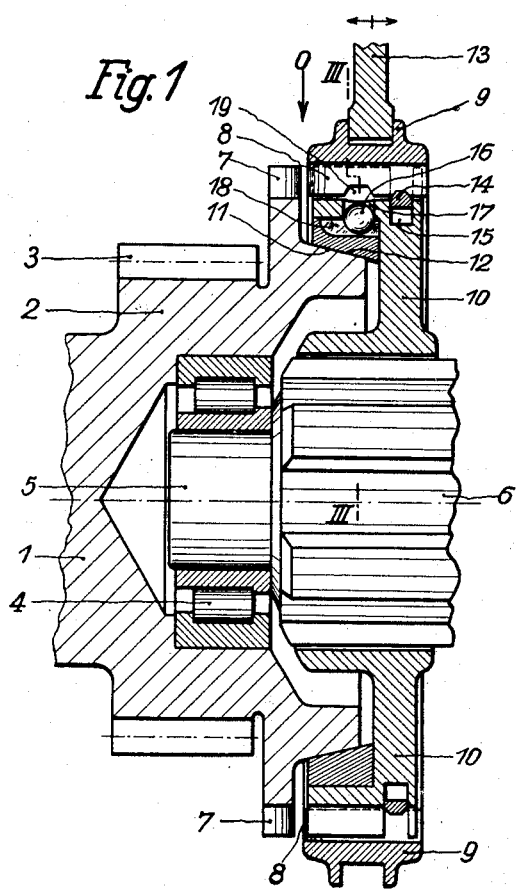
Figure 2:
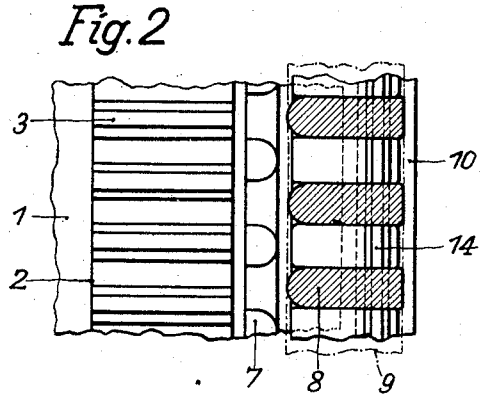
Figure 3:
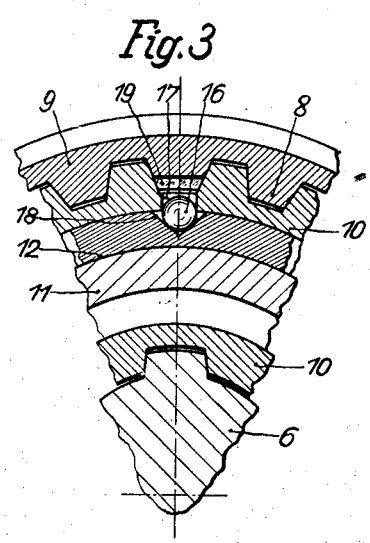

As to the example represented in Figs. 1 to 4 the driving shaft is designated at 1. Connected thereto is gear 2 adapted to mesh by means of teeth 3 with some other gear (not represented). Gear 2 is journaled at 4 on the end 5 of driven shaft 6, and it has clutch teeth 7 adapted to engage with clutch teeth 8 of the shiftable member 9 which is in driving connection with member 10 splined to driven shaft 6. Furthermore, there is a friction cone 11 provided on gear 2 adapted to cooperate with ring friction cone 12 which is adapted to have a limited turning movement relative to member 10. The latter member carrying friction cone 12 is adapted to be shifted axially on shaft 6 by means of lever 13.

There is a spring ring 14 situated in a circular groove 15 of member 10 which by its tension causes connection against axial movement between members 9 and 10; but these members are again disconnected in axial direction as soon as the shifting force exerted on lever 13 overcomes the tension of ring 14 so that it is pressed inwardly into the inner portion of groove 15. Then member 9 is free to move further to the left thereby causing engagement of clutch teeth 8 with clutch teeth 7.

Figure 4:
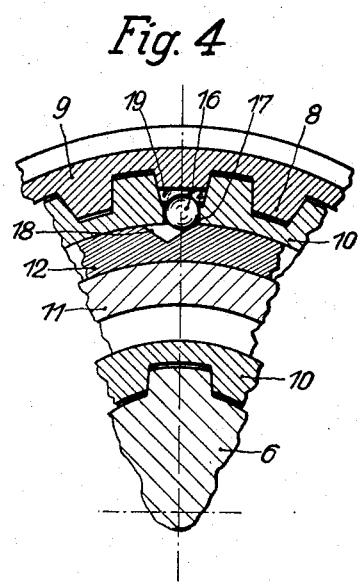

Thus, when engagement of the coupling is intended lever 13 is shifted to the left causing members 9 and 10 to follow such movement so that friction cone 12 is pressed against friction cone 11. Consequently the desired synchronizing effect between the two coupling halves is created. To prevent member 9 from further movement to the left which would cause teeth 8 to rattle past teeth 7 and possibly destroy them, there is a locking member, preferably a ball 16 or the like, situated in a bore 17 of member 10. Ring friction cone 12 is provided with a longitudinal notch 18 situated opposite bore 17 and having inclined side faces, so that ball 16 is pressed outward whenever member 12 tends to rotate inside of member 10 which will happen whenever member 2 rotates at a different speed than member 10 while both these members are tensioned against each other by shifting lever 13 to the left so that friction cone 11 slides on ring friction cone 12. As there is a further notch 19 provided in the tooth of member 9 and opposite to bore 17 in member 10, but in transverse direction, locking ball 16 will under the above mentioned conditions be pressed into this notch and thereby prevent member 9 with its teeth 8 from being moved into contact with teeth 7 of member 2 (Fig. 4).

But as soon as by means of the friction cones 11 and 12 being pressed against each other members 2 and 10 are synchronized the tension between members 10 and 12 vanishes and locking ball 16 is no more pressed outward into notch 19 of member 9 (Fig. 3), so that now this latter member after having overcome the resistance offered by the elastic ring 14 is free to move to the left and to cause engagement between teeth 8 and teeth 7 thereby bringing the two coupling halves into final engagement avoiding every shock.

Of course, we prefer to provide not only one locking ball on member 10 but to distribute a plurality, for example three, over its circumference.

Figure 5:
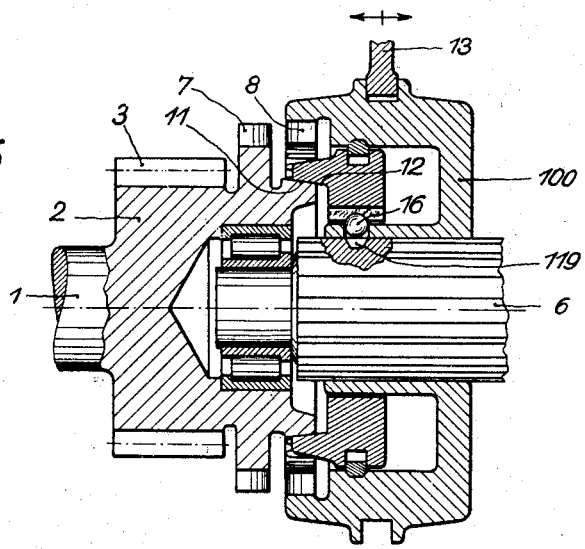
Fig. 5 is a longitudinal section through another modification of a claw coupling for gears of speed transmissions.

The example represented in Fig. 5 is substantially like that of Figs. 1 to 4. Only member 100 has a little different shape than member 10, and some of the members are arranged differently. On movement of lever 13 to the left and friction cones 11 and 12 being pressed against each other, locking ball 16 will be pressed inwardly into notch 119 provided in shaft 6, so that member 100 is prevented from further movement to the left until the friction has caused synchronization, upon synchronization locking ball 16 may easily be shifted back to its outer position— as represented in Fig. 5—thus allowing for member 100 to be shifted by lever 13 further to the left relative to both cone 12 and shaft 6 and bring about engagement between teeth 8 and 7 which means final engagement between gear 2 and shaft 6.

Figure 6:
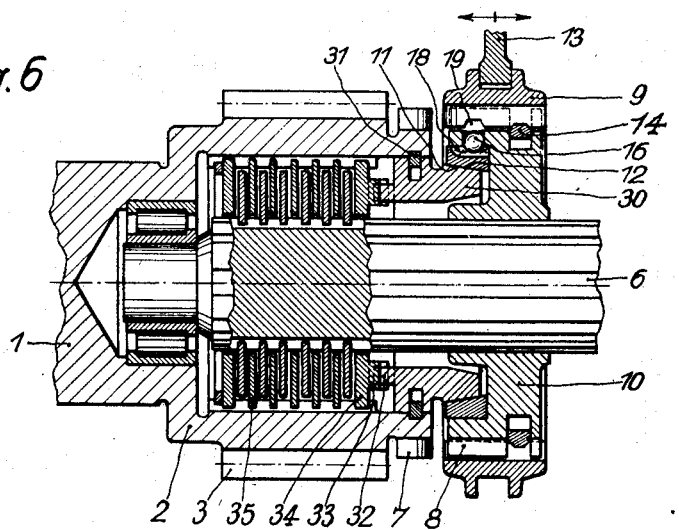
Fig. 6 represents a third modification, also in longitudinal section, equaling to that of Fig. 1 but including additional elements.

The third modification shown in Fig. 6 resembles that of Fig. 1 but it includes in addition a laminated friction clutch inserted in gear 2 for the purpose of reducing the time and force necessary for the synchronization of the two elements to be coupled, namely the gear 2 and the shaft 6.

Figure 7:
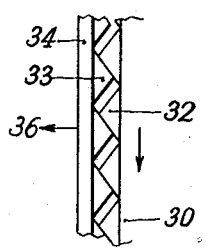
Fig. 7 is a diagrammatical view of a certain portion of the construction according to Fig. 6, as explained later.

Friction cone 11 in contradistinction to the examples represented in Figs. 1 and 5 is not provided on the gear 2 itself but on a ring member 30 adapted to rotate with regard to gear 2 but held axially by means of elastic ring 31. At the left hand end of ring member 30 inclined teeth 32 are provided adapted to co-operate with inclined teeth 33 (Fig. 7) on the end disc 34 of friction clutch 35 inserted inside of gear 2.

When lever 13 is moved to the left friction cones 11 and 12 are again pressed against each other and ball 16 is moved outwardly by the inclined side of longitudinal notch 18 and pressed into transverse notch 19, thus preventing teeth 7 and 8 from engagement. The torque exerted on ring member 30 by means of inclined teeth 32 and 33 causes a pressure on friction clutch 35, as indicated by arrow 36 in Fig. 7. Consequently, the synchronization of members 2 and 6 before their final engagement will be reached in a much shorter time period.

Figure 8:
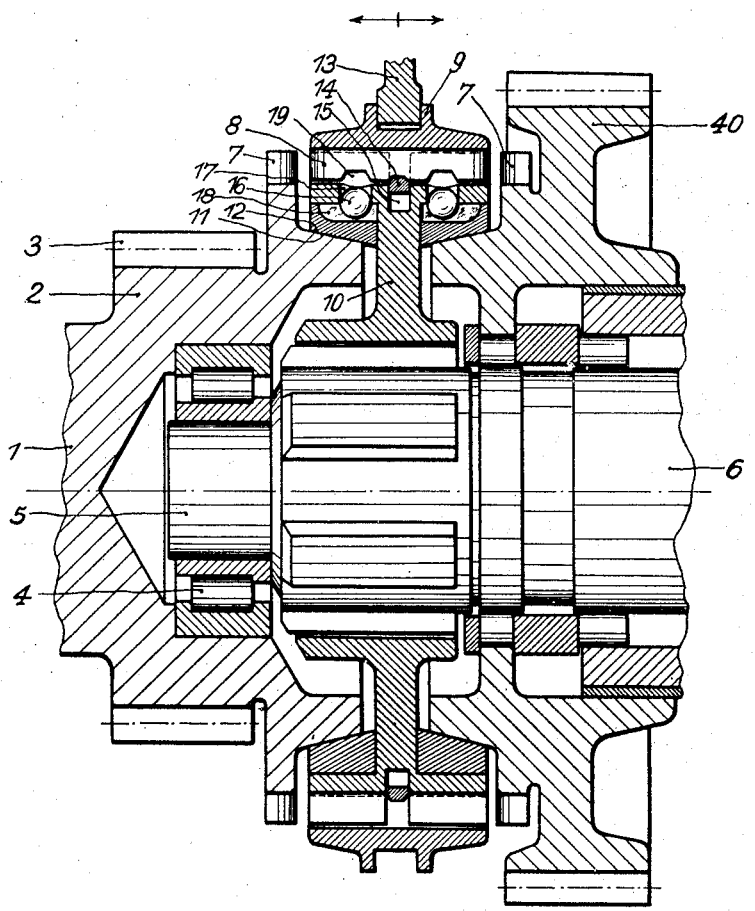
Fig. 8 shows the same example as Fig. 1 but in double-acting construction.

Fig. 8 is exactly like Fig. 1, only a second gear 40 is shown in addition which may be coupled to shaft 6 alternately with gear 2 in exactly the same manner, only by moving lever 13 to the right instead of to the left.

We do not want to be limited to the details described or shown in the drawings, as many variations may be made use of without deviating from the scope of our invention.

What we claim is:

1. A synchronizing transmission comprising a first rotatable member, a second rotatable member axially aligned with the first rotatable member, clutch teeth on the second rotatable member, means rotatable with the first rotatable member having clutch teeth and capable of shifting movement axially thereof to engage its teeth with the teeth of the second rotatable member, actuating means for shifting said toothed means, a friction clutch member having a driving connection with the second rotatable member, a coacting friction clutch member capable of rotational and axial movement relative to the toothed means on the first rotatable member, opposing circumferential grooves in said toothed means and in said coacting friction clutch member, a spring ring seating in one of said grooves and yieldingly engaging the other groove whereby on preliminary axial movement of the toothed means by the actuating means towards toothed clutching engagement said coacting friction clutch member is moved axially with the toothed means into clutching engagement with the friction clutch member having a driving connection with the second rotatable member and caused to rotate relative to the toothed means, and means responsive to rotation of said coacting friction clutch member for locking the toothed means against final axial movement into toothed clutching engagement with the teeth of the second rotatable member and being rendered inoperative when the first and second rotatable members have attained substantially the same speed of rotation.

2. A synchronizing transmission comprising a first rotatable member, a second rotatable member axially aligned with the first rotatable member, clutch teeth on the second rotatable member, a toothed sleeve splined on the first rotatable member for rotation therewith and for axial movement into clutching engagement with the teeth of the second rotatable member, a friction clutch member fixed to the second rotatable member, a circular recess in the side of said sleeve, a coacting friction clutch member rotatable and movable axially in said recess, actuating means for moving the sleeve towards toothed clutching engagement with the teeth of the second rotatable member, spring means for initially holding the second friction clutch member in fixed position relative to said sleeve so as to be brought into clutching engagement with the friction member on the second rotatable member during preliminary axial movement of the sleeve by its actuating means, locking means responsive to rotation of the friction clutch member carried by the sleeve for securing the sleeve against final axial movement into tooth clutching engagement, said locking means being rendered inoperative when the first and second rotatable members have attained substantially the same speed of rotation.

3. A synchronizing transmission comprising a first rotatable member, a second rotatable member axially aligned with the first rotatable member, clutch teeth on the second rotatable member, means rotatable with the first rotatable member having clutch teeth and capable of shifting movement axially thereof to engage its teeth with the teeth of the second rotatable member, actuating means for shifting said toothed means, a pair of coacting friction clutch members capable of rotation relative to the second rotatable member and said toothed means on the first rotatable member, and being adapted to be brought into friction clutching engagement with each other upon preliminary axial movement of the toothed means towards tooth clutching engagement with the second rotatable member, means responsive to engagement of the friction clutch members for locking said toothed means against final toothed clutching engagement with the second rotatable member, and means also responsive to engagement of the pair of friction clutch members for clutching one of said friction clutch members to the second rotatable member, said locking means being rendered inoperative when the first and second rotatable members have attained substantially the same speed of rotation.

AUGUST GUTER.
ALBERT MAIER.